United States Patent [19]
Chino

[11] Patent Number: 6,068,275
[45] Date of Patent: May 30, 2000

[54] STRUCTURE FOR MOUNTING DAMPERS ON VEHICLES

[75] Inventor: Kenji Chino, Kariya, Japan

[73] Assignee: Kabushiki Kaisha Toyoda Jidoshokki Seisakusho, Kariya, Japan

[21] Appl. No.: 09/108,913

[22] Filed: Jul. 1, 1998

[30] Foreign Application Priority Data

Jul. 4, 1997 [JP] Japan .................................. 9-179593

[51] Int. Cl.[7] ............................. B60G 25/00; B62D 17/00
[52] U.S. Cl. ........................... 280/124.112; 280/124.155; 280/754; 280/755; 403/409.1
[58] Field of Search ........................ 280/124.11, 124.16, 280/124.112, 124.155, 86.751, 86.752, 86.753, 86.754, 755, 754, 6.15; 188/321.11; 403/161, 157, 409.1, DIG. 8

[56] References Cited

U.S. PATENT DOCUMENTS

| | | | |
|---|---|---|---|
| 4,205,864 | 6/1980 | Hoefer | 280/124.112 |
| 4,382,604 | 5/1983 | Nakagawa | 280/124.112 X |
| 4,936,423 | 6/1990 | Karnopp | 188/299 |
| 5,104,141 | 4/1992 | Grove et al. | 403/409.1 |
| 5,308,048 | 5/1994 | Weaver et al. | 280/124.155 X |
| 5,332,255 | 7/1994 | Velazquez | 280/86.754 |
| 5,484,161 | 1/1996 | McIntyre | 280/124.155 |
| 5,639,119 | 6/1997 | Plate et al. | 280/124.112 X |

FOREIGN PATENT DOCUMENTS

| | | |
|---|---|---|
| 0 238 077 | 9/1987 | European Pat. Off. . |
| 3714689 | 11/1988 | Germany . |
| 58-183307 | 10/1983 | Japan . |
| 60-056620 | 4/1985 | Japan . |
| 60-094808 | 5/1985 | Japan . |
| 7-277054 | 10/1995 | Japan . |
| 8-021476 | 1/1996 | Japan . |

*Primary Examiner*—J. J. Swann
*Assistant Examiner*—Florian Zeender
*Attorney, Agent, or Firm*—Woodcock Washburn Kurtz Mackiewicz & Norris LLP

[57] ABSTRACT

A structure for mounting a hydraulic damper to a vehicle body is provided. The damper has a first end and a second end. The vehicle includes a vehicle frame that has a first bracket connected to the first end and an axle that has a second bracket connected to the second end. The axle is arranged to be pivotal with respect to the frame. The damper changes its length based on a swinging action of the axle. The first bracket has a first support hole. The second bracket has a second support hole. The first end has a first through hole and the second end has a second through hole. The first end and the second end of the damper are rotatably connected with the first bracket and the second bracket, respectively, by a shaft extending through at least one of the support holes and the associated through hole in a rotatable manner about its axis. The shaft has an adjusting element for adjusting the length of the damper to an optimum value based on the rotation of the shaft, and rotation of the shaft is prohibited by a prohibiting mechanism to maintain the length of the damper in the optimum value.

13 Claims, 4 Drawing Sheets

6,068,275

STRUCTURE FOR MOUNTING DAMPERS ON VEHICLES

BACKGROUND OF THE INVENTION

The present invention relates to a structure for supporting cylinders in industrial vehicles such as forklifts. More particularly, the present invention pertains to a structure for supporting cylinders, which connect an axle to a vehicle body frame such that the axle is tiltable with respect to the body frame.

DESCRIPTION OF THE RELATED ART

A forklift has a body frame and axles that are coupled to the body frame. To provide driving stability and riding comfort, there are forklifts having an axle that is pivotal with respect to the body frame. However, in such forklifts, centrifugal force tilts the forklift when the forklift changes directions. Therefore, the pivotal axles hinder stable steering and make it difficult to increase speed when changing directions.

Japanese Unexamined Patent Publication No. 58-183307 describes a forklift that locks its pivotal axle if the centrifugal force produced when steering the forklift exceeds a predetermined value. The locking of the axle holds the axle in a fixed state and enables stable steering.

The axle is connected to the body frame by a hydraulic resistance cylinder (damper) that serves to dampen shocks. A hydraulic circuit is connected to the resistance cylinder to selectively lock and unlock the resistance cylinder. The resistance cylinder has a piston rod connected to the body frame. When the resistance cylinder is unlocked, the flow of hydraulic oil in the hydraulic circuit permits the piston rod to project from or retract into the resistance cylinder. In this state, the resistance cylinder permits pivoting of the axle. To lock the resistance cylinder, the flow of the oil is stopped. Locking the cylinder keeps the piston rod fixed at the same position. In this state, the resistance cylinder locks the axle to the body frame so that it cannot pivot.

The axle includes an axle bracket to which the resistance cylinder is coupled, while the body frame includes a frame bracket to which the resistance cylinder is coupled. The distance between the brackets may deviate from the ideal distance due to dimensional tolerances. However, the structure for supporting the resistance cylinder does not provide a mechanism for accommodating such dimensional differences.

In addition, if the dimensional deviation is large, the performance of each resistance cylinder may be affected. In other words, the resistance cylinder may not perform as desired. In some cases, this may damage the resistance cylinder.

SUMMARY OF THE INVENTION

Accordingly, it is an objective of the present invention to provide a resistance cylinder supporting structure that accommodates deviations in the distance between the support brackets and that facilitates the installation of resistance cylinders.

To achieve the above objective, the present invention provides a structure for mounting a hydraulic damper to a vehicle body. The damper has a first end and a second end. The vehicle has a vehicle frame connected to the first end and an axle connected to the second end. The axle is arranged to be pivotal with respect to the frame. The damper changes its length based on a swinging action of the axle. The structure includes a first bracket provided with the frame. The first bracket has a first support hole and a second bracket provided with the axle. The second bracket has a second support hole. The first end has a first through hole and the second end has a second through hole. A connecting means rotatably connects the first end and the second end of the damper with one of the first bracket and the second bracket, respectively. The connecting means extends through one of the support holes as well as the associated through hole in a rotatable manner about its axis. The connecting means includes an adjusting means for adjusting the length of the damper to an optimum value based on the rotation of the connecting means. A prohibiting means prohibits the rotation of the connecting means to maintain the length of the damper in the optimum value.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment according to the present invention will now be described with reference to FIGS. 1 to 4.

Figure 1:
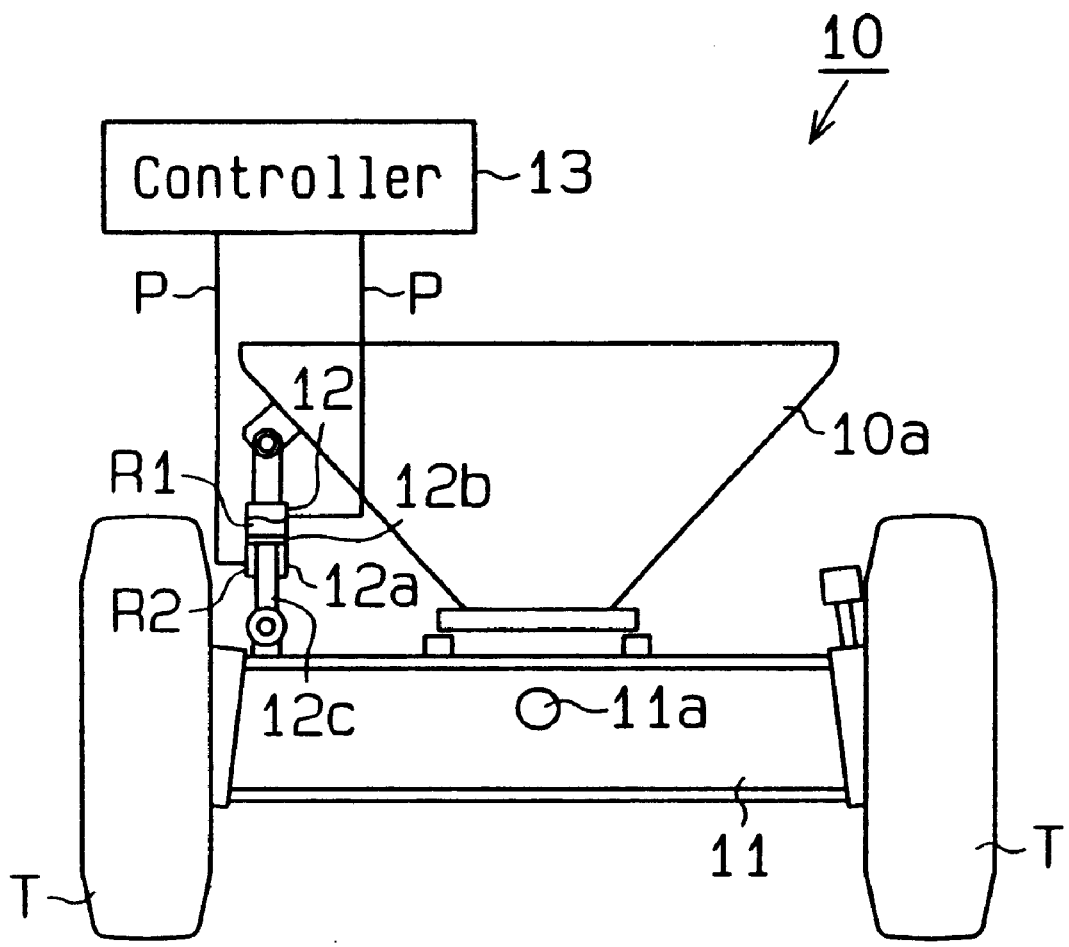
FIG. 1 is a diagrammatic view showing a structure for locking a rear axle in an industrial vehicle to which the present invention is applied.

A structure for mounting rear wheels T on an industrial vehicle, or forklift 10, is shown in FIG. 1. The forklift 10 has a body frame 10a. The rear wheels T are mounted on each end of a rear axle 11, which is located beneath the rear section of the forklift 10. The rear axle 11 is pivotally supported to the frame by a center pin 11a.

The frame 10a and the rear axle 11 are also connected to each other by a damper, or hydraulic resistance cylinder 12. The resistance cylinder is a multi-movement hydraulic cylinder that dampens the forces applied to the rear wheels T.

The resistance cylinder 12 includes a tube 12a, a piston 12b accommodated in the tube 12a, and a piston rod 12c having an end connected with the piston 12b. The other end of the piston rod 12c is connected to the rear axle 11.

The piston 12b defines a first oil chamber R1 and a second oil chamber R2 in the resistance cylinder 12. The first and second oil chambers R1, R2 are connected to a controller 13 through a pair of passages P, respectively. The controller 13 selectively opens and closes the passages P to control the flow of hydraulic oil in the resistance cylinder 12 and thus lock or unlock the resistance cylinder 12. That is, the controller 13 locks or unlocks the resistance cylinder 12 to maintain stability and enhance the driving performance and riding comfort of the forklift 10.

Figure 2:
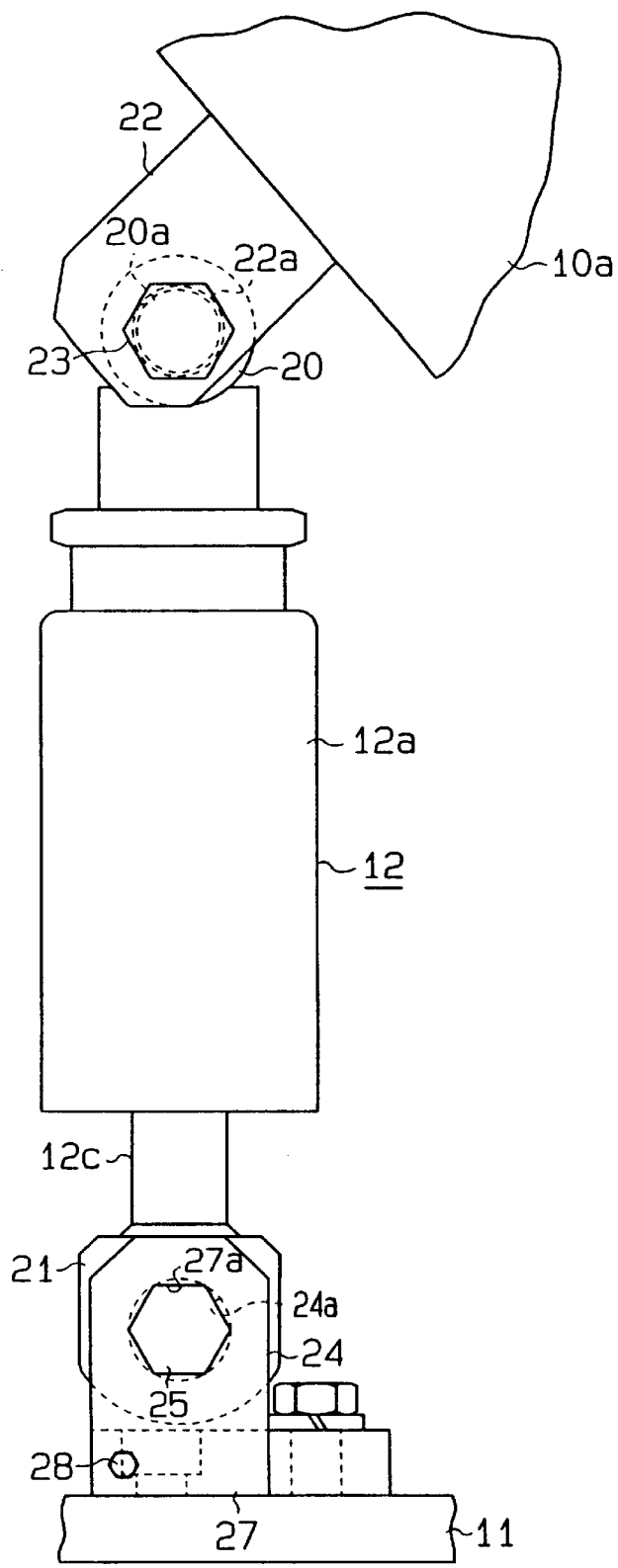
FIG. 2 is a schematic view showing a structure for supporting the resistance cylinder of FIG. 1.
Figure 3:
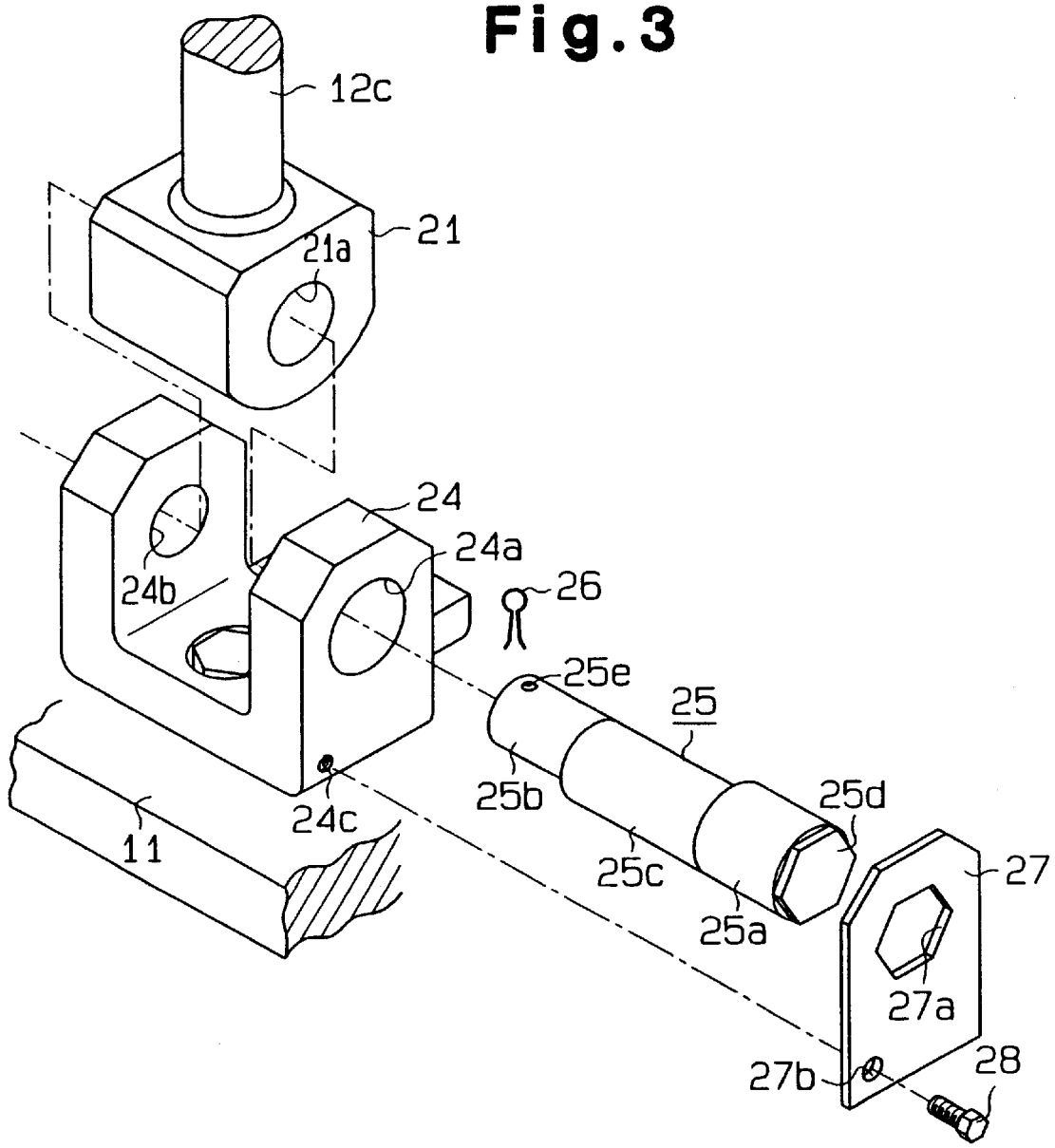
FIG. 3 is an exploded perspective view showing the lower resistance cylinder support bracket of FIG. 2.

FIGS. 2 and 3 show a structure for coupling the resistance cylinder 12 to the body frame 10a and the rear axle 11. The cylinder tube 12a has an upper joint 20 through which a bore 20a extends. The piston rod 12c also has a lower joint 21 through which a bore 21a extends. A U-shaped first bracket, or upper bracket 22, which has a pair of parallel walls, is fixed to the body frame 10a to support the resistance cylinder 12. A hole 22a extends through each of the walls, or legs, of the upper bracket 22. The upper joint 20 of the cylinder tube 12a is fitted between the walls of the upper bracket 22. A bolt 23 is inserted through the bracket holes 22a and the joint bore 20a and fastened by a nut (not shown). Accordingly, the cylinder tube 12a is pivotally connected to the body frame 10a.

A U-shaped second bracket, or lower bracket 24, is fixed to the rear axle 11 by fasteners, such as bolts, to support the resistance cylinder 12. The lower bracket 24 has a pair of parallel walls, like the upper bracket 22. A first hole 24a extends through one of the walls of the lower bracket 24, while a second hole 24b extends through the other wall. The diameter of the second hole 24b is smaller than that of the first hole 24a. A threaded hole 24c is formed in the lower bracket 24 near the first hole 24a. The lower joint 21 of the piston rod 12c is fitted between the walls of the lower bracket 24. An eccentric shaft 25 is inserted through the bracket holes 24a, 24b and the joint bore 21a.

Figure 4:
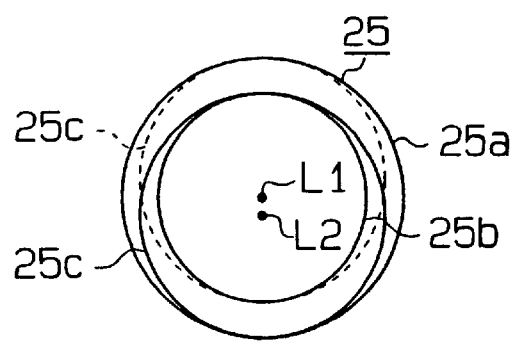
FIG. 4 is a schematic end view showing an eccentric shaft.

The eccentric shaft 25 has a first end segment 25a, which is located in the first hole 24a, and a second end segment 25b, which is located in the second hole 24b. The diameter of the second end segment 25b is smaller than that of the first end segment 25a. As shown in FIG. 4, the first and second end segments 25a, 25b are concentric and coaxial. That is, the end segments 25a, 25b share axis L1.

The eccentric shaft 25 also has an eccentric portion 25c, which is located in the joint bore 21a between the first and second end segments 25a, 25b. As shown in FIG. 4, the eccentric portion 25c has an axis L2 that is offset from the axis L1. The diameter of the eccentric portion 25c is smaller than that of the first end segment 25a and larger than that of the second end segment 25b. The eccentric portion 25c has a certain radius so that its peripheral surface does not extend radially outward more than the surface of the first end segment 25a, as shown in FIG. 4.

The axial length of the eccentric shaft 25 is slightly more than the distance between the outer surfaces of the bracket walls. The first and second end segments 25a, 25b are each axially longer than the thickness of the associated bracket wall. The eccentric shaft 25 is first inserted into the first hole 24a. The eccentric shaft 25 is then inserted through the lower joint bore 21a and into the second hole 24b until the eccentric portion 25c abuts against the bracket wall through which the second hole 24b extends. In this state, the concentric end segments 25a, 25b project outward from the associated bracket walls. A hexagonal head 25d is formed on the part of the first end segment 25a that projects outward from the associated bracket wall. A pin hole 25e extends radially through the second end segment 25b at a location outward from the surface of the associated bracket wall.

After the second end segment 25b is inserted through the second hole 24b, a cotter pin 26 is fitted into the pin hole 25e to keep the eccentric shaft 25 held in the lower bracket 24. In this state, the eccentric shaft 25 can be rotated. By rotating the eccentric shaft 25 about the axis L1, the distance between the axis L2 of the eccentric portion 25c, which is also the axis of the lower joint bore 21a, and the bolt 23, which fastens the resistance cylinder 12 to the body frame 10a, can be changed. In other words, the lower bracket 24 with respect to the resistance cylinder 12 is adjusted by rotating the eccentric shaft 25.

A lock plate 27 having a hexagonal hole 27a is fitted on the head 25d after adjusting the distance between the bolt 23 and the axis L2. The lock plate 27 has a shape similar to that of the associated bracket wall. A bolt hole 27b extends through the lock plate 27 at a position corresponding to the threaded hole 24c of the lower bracket 24. A bolt 28 is inserted through the bolt hole 27b and screwed into the threaded hole 24c to fasten the lock plate 27 to the lower bracket 24 and restrict the rotation of the eccentric shaft 25. In the preferred and illustrated embodiment, the rotational phase of the eccentric shaft 25 can be adjusted by a minimum interval of 60 degrees to alter the distance between the axis L2 and the bolts 23.

The preferred and illustrated embodiment has the advantages described below.

(1) The axis L2 of the eccentric portion 25c of the eccentric shaft 25 is offset from the axis L1 of the first and second end segments 25a, 25b. Accordingly, rotation of the eccentric shaft 25 adjusts the position of the resistance cylinder 12 with respect to the first and second brackets 22, 24. In other words, the eccentric shaft 25 accommodates deviations in the distance between the brackets 22, 24 when installing the resistance cylinder 12. This facilitates the installation of the resistance cylinder 12.

(2) The eccentric shaft 25 is preferably used only for the lower bracket 24, which is fixed to the rear axle 11. This facilitates the installation of the resistance cylinder 12 to the upper and lower brackets 22, 24. Furthermore, costs are saved since there is only one eccentric shaft 25, which must be machined in a special manner.

(3) The hexagonal head 25d of the eccentric shaft 25 and the lock hole 27a of the lock plate 27 are hexagonal (polygonal). This prevents rotation of the eccentric shaft 25 and simplifies the formation of the head 25d and the lock hole 27a.

(4) The lock plate 27 is formed having a shape similar to that of the associated wall of the lower bracket 24 such that the lower edge of the lock plate 27 abuts against the upper surface of the rear axle 11. The rear axle 11 thus prevents rotation of the lock plate 27 even when a rotating force is applied to the lock plate 27. This structure keeps the bolt 28 free from loads and prevents the bolt 28 from being damaged.

It should be apparent to those skilled in the art that the present invention may be embodied in many other specific forms without departing from the spirit or scope of the invention. More particularly, it should be understood that the present invention may be modified as described below.

In the preferred and illustrated embodiment, the eccentric shaft 25 is coupled with the lower bracket 24, which is fixed to the rear axle 11. However, the eccentric shaft 25 may be coupled with the upper bracket 22 instead of the lower bracket 24. As another option, an eccentric shaft may be provided for both upper and lower brackets 22, 24.

Furthermore, a bracket identical to the lower bracket 24 may be employed to secure the resistance cylinder 12 to the body frame 10a. In this case, the upper bracket fixed to the body frame 10a and the lower bracket fixed to the rear axle 11 would each employ an eccentric shaft 25. In this structure, the distance between the brackets can be adjusted at either end of the cylinder 12. Thus, in comparison to the illustrated embodiment, the position of the cylinder 12 with respect to the brackets is adjusted in a more fine manner and the accommodation of dimensional differences is more flexible.

Figure 5:
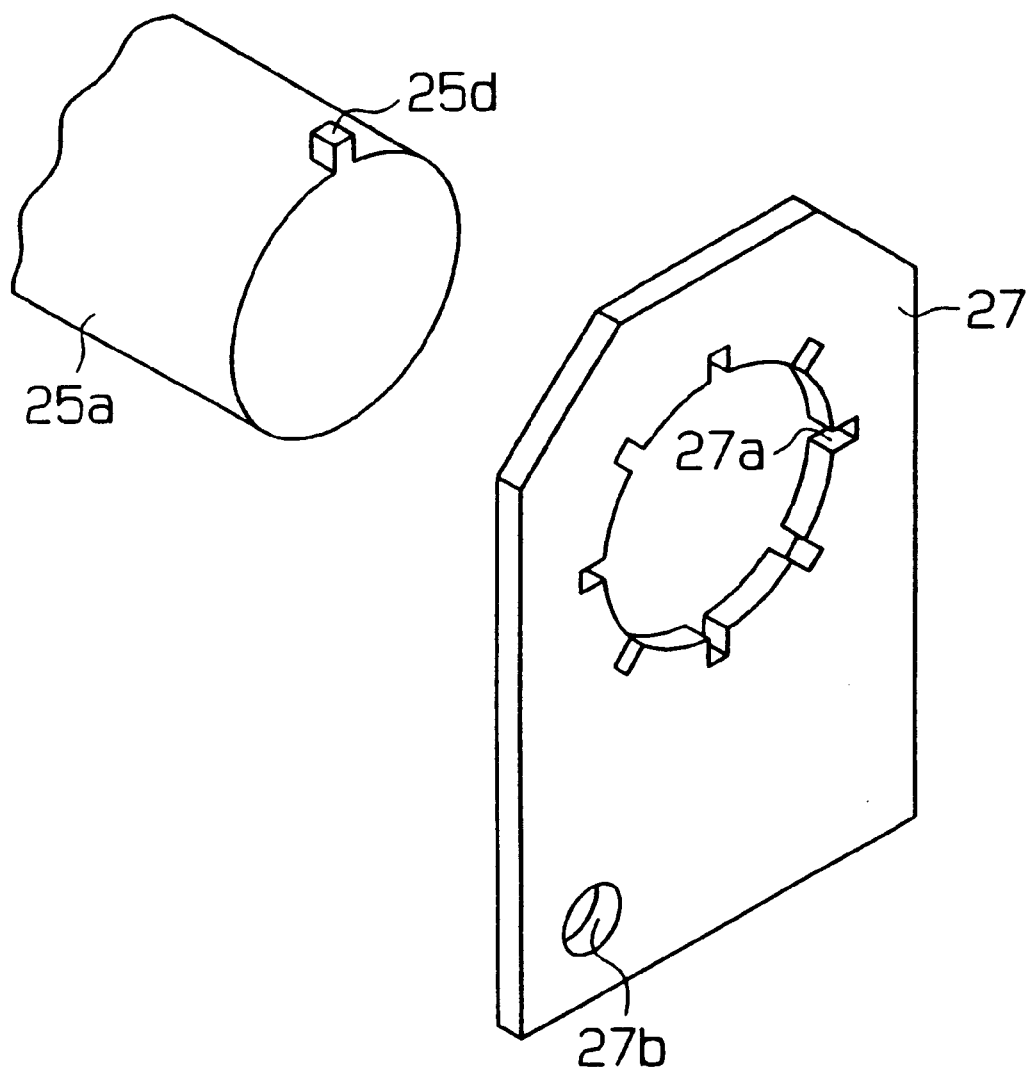
FIG. 5 is an exploded perspective view showing a lock and a lock plate employed in a further embodiment according to the present invention.

In the preferred and illustrated embodiment, the head 25*d* of the eccentric shaft 25 and the lock hole 27*a* of the lock plate 27 need not be hexagonal as long as rotation of the eccentric shaft 25 with respect to the lower bracket 24 can be restricted. For example, the head 25*d* and the lock hole 27*a* may be a polygon other than a hexagon. As another example, a key 25 may be formed on the first end segment 25*a* to engage one of a plurality of keyways 27*a* formed in the lock plate 27, as shown in FIG. 5.

In the preferred and illustrated embodiment, the shape of the lock plate 27 is substantially the same as that of the associated wall of the lower bracket 24. However, as long as the lower edge of the lock plate 27 abuts against a fixed surface to restrict rotation of the lock plate 27 relative to the rear axle 11, the shape of the lock plate 27 may be changed arbitrarily. Furthermore, if the bolt 28 has sufficient strength and can prevent rotation of the lock plate 27, the bottom edge of the lock plate 27 need not abut against the rear axle 11.

In the preferred and illustrated embodiment, the lock plate 27 is fastened to the lower bracket 24 by the bolt 28. However, other types of fasteners can be employed as long as the lock plate 27 can be fixed to the lower bracket 24.

In the preferred and illustrated embodiment, the diameter of the eccentric portion 25*c* is larger than that of the second end segment 25*b* and smaller than that of the first end segment 25*a*. However, the present invention is not limited to such dimensional relationships. Other dimensional relationships are possible as long as the axis L2 of the eccentric portion 25*c* is offset from the axis L1 of the first and second end segments 25*a*, 25*b* and the peripheral surface of the eccentric portion 25*c* does not project radially further than the peripheral surfaces of the first and second end segments 25*a*, 25*b*.

In the preferred and illustrated embodiment, the cotter pin 26 is inserted into the pin hole 25*e* to keep the eccentric shaft 25 from falling out of the lower bracket 24. However, fasteners other than the cotter pin 26 may be employed as long as the eccentric shaft 25 can be held in the lower bracket 24.

In the preferred and illustrated embodiment, the present invention is applied to a forklift employing one type of resistance cylinder 12. However, the present invention may be employed in a forklift employing many types of resistance cylinders.

Therefore, the present examples and embodiments are to be considered as illustrative and not restrictive and the invention is not to be limited to the details given herein, but may be modified within the scope and equivalence of the appended claims.

What is claimed is:

1. A structure for mounting a hydraulic damper to a vehicle body, said damper having a first end and a second end, said vehicle having a vehicle frame connected to the first end and an axle connected to the second end, wherein said axle is arranged to be pivotal with respect to the frame, and wherein said damper changes its length based on a swinging action of the axle, said structure comprising:

a first bracket provided with the frame, said first bracket having a first support hole;

a second bracket provided with the axle, said second bracket having a second support hole;

said first end having a first through hole and said second end having a second through hole;

connecting means for rotatably connecting one of the first end and the second end of the damper with one of the first bracket and the second bracket, respectively, said connecting means extending through one of the support holes as well as the associated through hole in a rotatable manner about its axis; and said connecting means including adjusting means that adjusts based on the rotation of the connecting means for accommodating deviations in a distance between the first and second brackets;

prohibiting means for prohibiting the rotation of the connecting means to maintain the distance at an optimum value.

2. The structure as set forth in claim 1, wherein said connecting means includes a shaft having three portions with diameters differing from one another.

3. The structure as set forth in claim 2, wherein three portions include a large diameter portion, a small diameter portion and an eccentric portion located between the large diameter portion and the small diameter portion, said large diameter portion and said small diameter portion sharing a common axis of rotation, said eccentric portion serving as the adjusting means.

4. The structure as set forth in claim 3, wherein said eccentric portion having a first section continuous to the large diameter portion and a second section continuous to the small diameter portion, wherein the first section accommodates a maximum distance between the first and second brackets and wherein the second section accommodates a minimum distance between the first and second brackets.

5. The structure as set forth in claim 4, further comprising:

at least one of the bracket having a side surface;

a plate secured to the side surface of the bracket;

said plate having a polygonal hole; and said large diameter portion having a polygonal end fitted in the polygonal hole, said polygonal hole and said polygonal end forming said prohibiting means.

6. The structure as set forth in claim 5, wherein said plate has a shape identical to that of the side surface of the bracket.

7. The structure as set forth in claim 4, further comprising:

at least one of the bracket having a side surface;

a plate secured to the side surface of the bracket;

said plate having a receiving hole with an inner peripheral surface, said inner peripheral surface having a plurality of notches extending outwardly and radially with respect to the receiving hole; and said large diameter portion having an inserting end fitted in the receiving hole, said inserting end having a projection that is fitted in one the notches, wherein said notches and said projection form said prohibiting means.

8. The structure as set forth in claim 7, wherein said plate has a shape identical to that of the side surface of the bracket.

9. A structure for mounting a hydraulic damper to a vehicle body, said damper having a first end and a second end, said vehicle having a vehicle frame connected to the first end and an axle connected to the second end, wherein said axle is arranged to be swingable with respect to the frame, and wherein said damper changes its length based on a swinging action of the axle, said structure comprising:

a first bracket provided with the frame, said first bracket having a first support hole;

a second bracket provided with the axle, said second bracket having a second support hole;

said first end having a first through hole and said second end having a second through hole;

a shaft for rotatably connecting one of the first end and the second end of the damper with one of the first bracket and the second bracket, respectively, said shaft extending through one of the support holes as well as the associated through hole in the rotatable manner about its axis; and said shaft having a large diameter portion, a small diameter portion, and an eccentric portion located between the large diameter portion and the small diameter portion, said large diameter portion and said small diameter portion sharing a common axis of rotation, said eccentric portion having a first section continuous to the large diameter portion and a second section continuous to the small diameter portion, wherein the first section accommodates a maximum distance between the first and second brackets and wherein the second section accommodates a minimum distance between the first and second brackets; and prohibiting means for prohibiting the rotation of the connecting means to maintain the distance at an optimum value.

10. The structure as set forth in claim 9, further comprising:

at least one of the brackets having a side surface;

a plate secured to the side surface of the bracket;

said plate having a polygonal hole; and said large diameter portion having a polygonal end fitted in the polygonal hole, said polygonal hole and said polygonal end forming said prohibiting means.

11. The structure as set forth in claim 10, wherein said plate has a shape identical to that of the side surface of the bracket.

12. The structure as set forth in claim 9, further comprising:

at least one of the brackets having a side surface;

a plate secured to the side surface of the bracket;

said plate having a receiving hole with an inner peripheral surface, said inner peripheral surface having a plurality of notches extending outwardly and radially with respect to the receiving hole; and said large diameter portion having an inserting end fitted in the receiving hole, said inserting end having a projection that is fitted in one the notches, wherein said notches and said projection form said prohibiting means.

13. The structure as set forth in claim 12, wherein said plate has a shape identical to that of the side surface of the bracket.

* * * * *